United States Patent
Yu et al.

(10) Patent No.: US 9,902,218 B1
(45) Date of Patent: Feb. 27, 2018

(54) FIXING ELEMENT FOR TIRE PRESSURE MONITORING DEVICE

(71) Applicant: CUB ELECPARTS INC., Fuxing Township, Changua County (TW)

(72) Inventors: San-Chuan Yu, Fuxing Township, Changhua County (TW); Yu-Shun Lin, Fuxing Township, Changhua County (TW); Ming-Li Chou, Fuxing Township, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 0 days.

(21) Appl. No.: 15/364,652

(22) Filed: Nov. 30, 2016

(30) Foreign Application Priority Data

Aug. 23, 2016 (TW) .............................. 105126933 A

(51) Int. Cl.
*B60C 23/04* (2006.01)
*G01F 17/00* (2006.01)
*B60Q 1/00* (2006.01)
*F16M 11/00* (2006.01)

(52) U.S. Cl.
CPC ................................ *B60C 23/0498* (2013.01)

(58) Field of Classification Search
CPC ............ B60C 23/0408; B60C 23/0498; B60C 23/0491
USPC ...... 248/230.8, 316.1, 542, 904, 309.1, 682; 73/146, 146.3, 146.4, 146.5; 340/442, 340/447, 449; 116/34 R
See application file for complete search history.

(56) References Cited

U.S. PATENT DOCUMENTS

| | | | | |
|---|---|---|---|---|
| 4,235,184 A * | 11/1980 | Schiavone | .......... | B60C 23/0408 116/34 R |
| 7,441,452 B2 * | 10/2008 | Phalak | ................ | B60C 23/0408 73/146 |
| 8,026,802 B2 * | 9/2011 | Shimura | ............. | B60C 23/0408 340/442 |
| 8,776,589 B1 * | 7/2014 | Brown | ................ | B60C 23/0408 73/146 |
| 2003/0126918 A1 * | 7/2003 | Chuang | ............... | B60C 23/0408 73/146 |
| 2006/0220812 A1 * | 10/2006 | Luce | ................... | B60C 23/0408 340/442 |

* cited by examiner

*Primary Examiner* — Tan Le
(74) *Attorney, Agent, or Firm* — Muncy, Geissler, Olds & Lowe, P.C.

(57) ABSTRACT

A fixing element adapted for a tire pressure monitoring device includes a base, a locking portion, and two stop blocks. The base includes a first plate and two second plates. The second plates are connected to two corresponding lateral sides of the first plate respectively to give the base an elongated shape. The bottom side of the base can be tightly attached to the rim of a wheel. The body portion of each second plate is penetrated by an aperture through which an annular member can pass. The locking portion has a through hole. A fixing member can pass through the through hole and be fixed to the tire pressure monitoring device. The two stop blocks are provided on the two second plates of the base respectively. The fixing element allows the tire pressure monitoring device to stay in a fixed state.

9 Claims, 7 Drawing Sheets

FIXING ELEMENT FOR TIRE PRESSURE MONITORING DEVICE

BACKGROUND OF THE INVENTION

1. Technical Field

The present invention relates to the technical field of tire pressure monitoring devices and more particularly to a fixing element adapted for a tire pressure monitoring device.

2. Description of Related Art

Nowadays, a car can be mounted with an additional tire pressure monitoring system (TPMS) to enhance the driver's and passengers' safety. Be it of the pointer type or equipped with an electronic display, each tire pressure monitoring device of the system can measure the real-time pressure, temperature, or like data of a car tire before the car is started or while the car is running, in order to ensure the driver's and passengers' safety on the road.

To mount a tire pressure monitoring device to a car tire, it is typically required to tie or fix the base of the device to a wheel's rim or in the tire. However, a tire pressure monitoring device thus mounted may become loose or even shifted in place when the car is running. Should this happen to any tire pressure monitoring device of a car, a significant error may occur in the real-time measurements of tire pressure, tire temperature, or like data while the car is running and have an indirect impact on the driver's and passengers' safety on the road.

In light of the above, the present invention aims to overcome the aforesaid drawbacks of the prior art by finding a way to effectively secure a tire pressure monitoring device at its initial position.

BRIEF SUMMARY OF THE INVENTION

In view of the aforesaid drawbacks of the prior art, it is an objective of the present invention to provide a fixing element adapted for a tire pressure monitoring device. It is highly desirable that the fixing element provides significant improvement not only on the fixed state of the tire pressure monitoring device with respect to the fixing element, but also on the secureness of the tire pressure monitoring device at its initial position, so as to achieve the intended effect and objective of the invention.

To achieve the foregoing objective, the present invention provides a fixing element which is adapted for a tire pressure monitoring device and which includes a base, a locking portion, and at least two stop blocks.

The base is composed of a first plate and two second plates. The two second plates are connected to two corresponding lateral sides of the first plate respectively such that the base has an elongated shape. The base has a top side and a bottom side corresponding to the top side. The bottom side of the base can be tightly attached to the rim of a wheel by bending each of the two second plates of the base by a predetermined angle. Each of the two second plates of the base has a body portion penetrated by an aperture through which an annular member can pass.

The locking portion has one end connected to a long side of the base and the opposite end extending upward from the top side of the base. The locking portion has a through hole, and a fixing member can pass through the through hole in order to be fixed to the tire pressure monitoring device.

The two stop blocks are provided on the two second plates of the base respectively and are raised upward from a reference plane defined by the top side of the base.

DETAILED DESCRIPTION OF THE INVENTION

Figure 1:
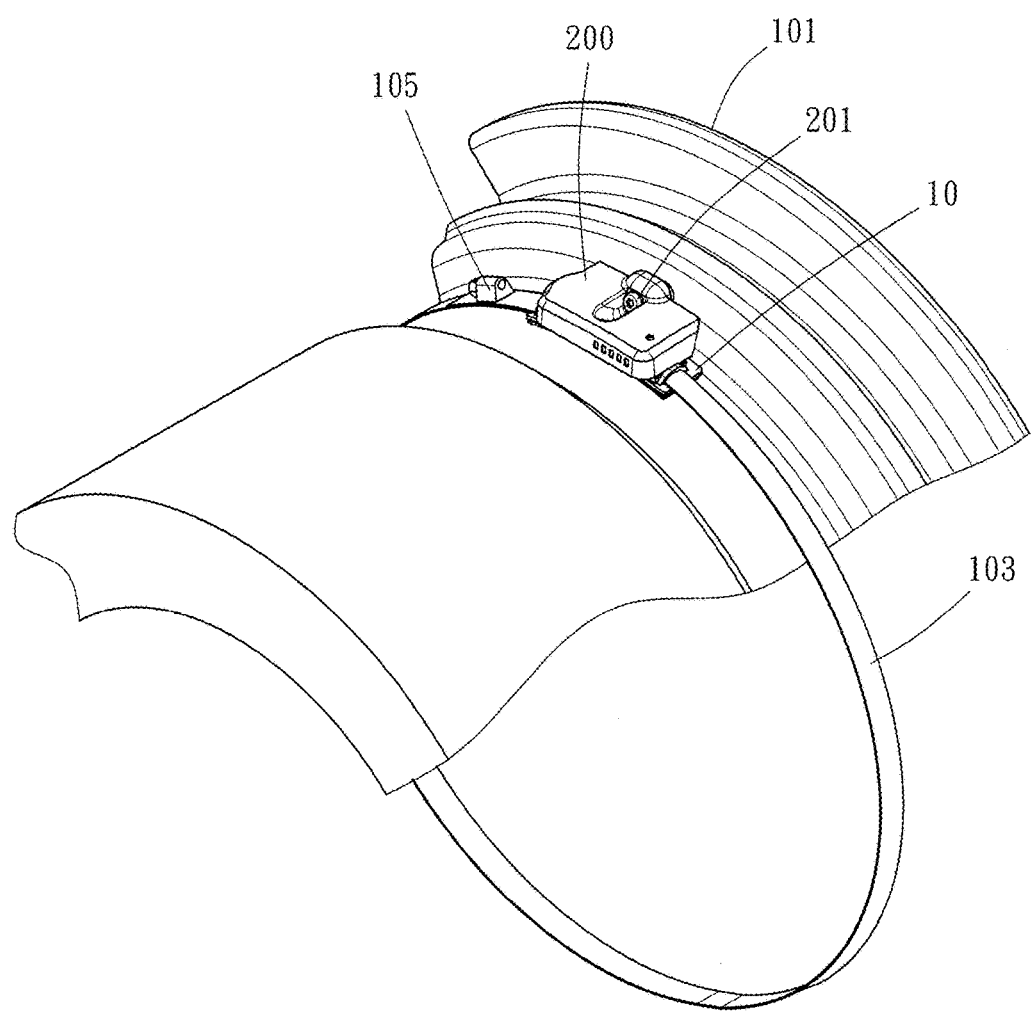
FIG. 1 is a perspective view showing how the fixing element in the first preferred embodiment of the present invention is used.
Figure 2:
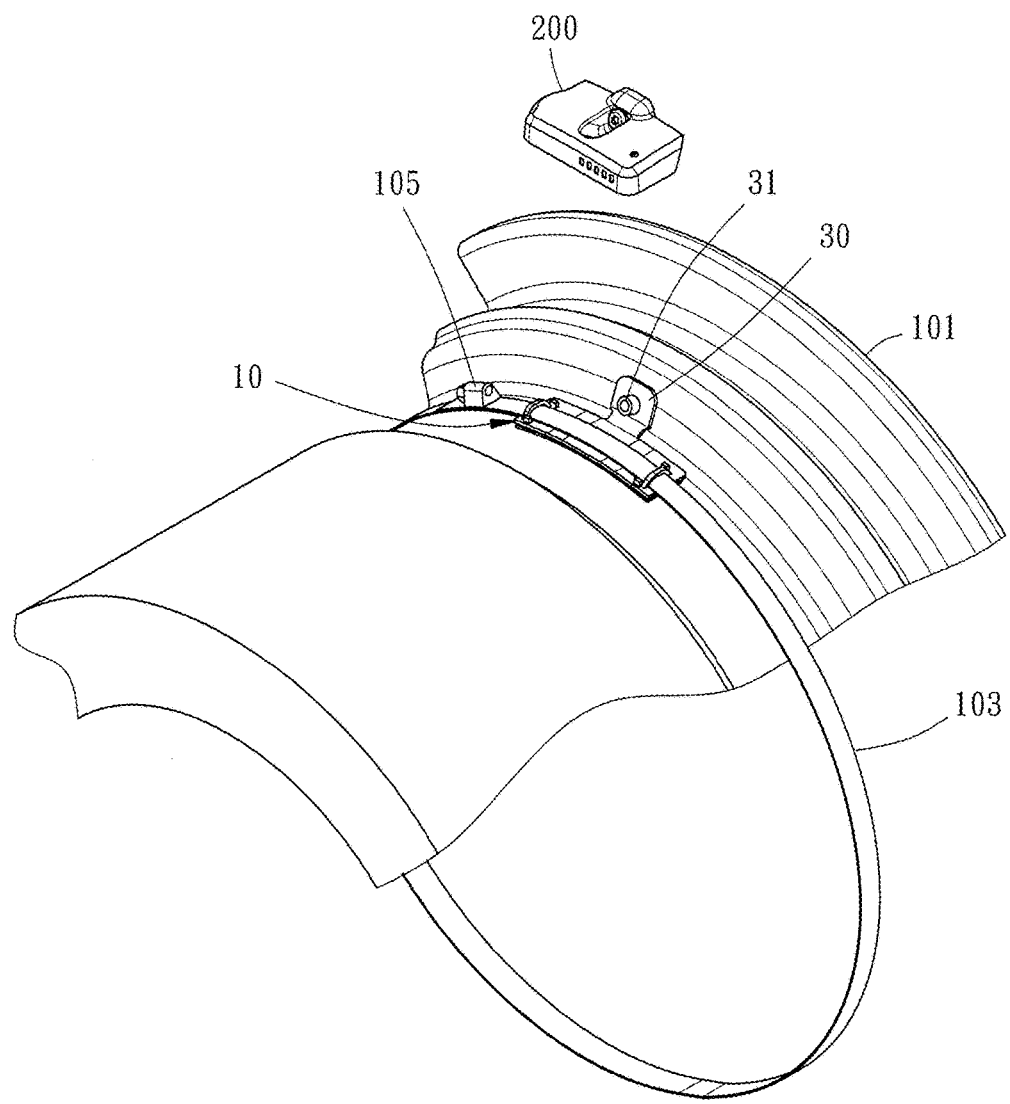
FIG. 2 is a perspective view showing how a tire pressure monitoring device is mounted to the fixing element in the first preferred embodiment of the present invention.
Figure 3:
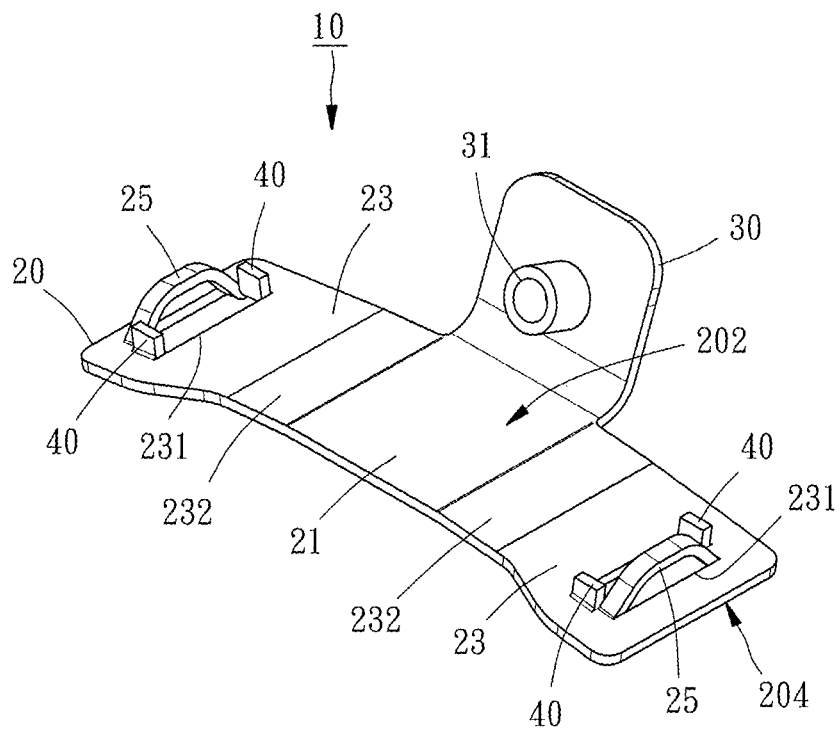
FIG. 3 is a perspective view of the fixing element in the first preferred embodiment of the present invention.
Figure 4:
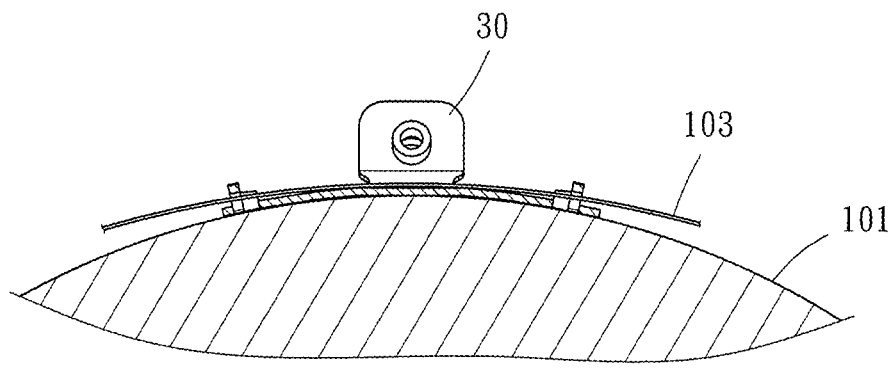
FIG. 4 is a side view showing how the fixing element in the first preferred embodiment of the present invention is used.

The structural features of the present invention and their intended effects are described in more detail below with reference to some illustrative embodiments in conjunction with the accompanying drawings. Please note that the same reference numerals used in the embodiments and the drawings refer to identical or similar elements, components, articles, structures, systems, architectures, devices, process flows, methods, or steps.

Referring to FIG. 1 to FIG. 4, the present invention provides a fixing element 10 adapted for a tire pressure monitoring device 200, wherein the fixing element 10 includes a base 20, a locking portion 30, and at least two stop blocks 40.

The base 20 is composed of a first plate 21 and two second plates 23. The two second plates 23 are connected to two corresponding lateral sides of the first plate 21 respectively such that the base 20 has an elongated shape. The base 20 has a top side 202 and a bottom side 204 corresponding to the top side 202. The bottom side 204 of the base 20 can be tightly attached to the rim 101 of a wheel by bending each of the two second plates 23 of the base 20 by a predetermined angle. Each of the two second plates 23 of the base 20 has a body portion penetrated by an aperture 231. An annular member 103 can be passed sequentially through the apertures 231 and then fixed to the rim 101. In addition, each of the two second plates 23 has an extended section 232, and the two second plates 23 are connected to the first plate 21 through their respective extended sections 232.

In this embodiment, the first plate 21 and the two second plates 23 of the base 20 and the extended sections 232 of the two second plates 23 are all flexible, or bendable. The base 20 further has two protective members 25 provided on the top side 202 of the base 20. Each of the two protective members 25 is raised from the periphery of the aperture 231 of one of the two second plates 23 of the base 20 and forms a pull-ring structure. The annular member 103 is confined within the pull-ring structures of the protective members 25 after being passed sequentially through the apertures 231 of the two second plates 23.

The locking portion 30 has one end connected to a long side of the base 20. The opposite end of the locking portion 30 extends upward from the top side 202 of the base 20. The locking portion 30 has a through hole 31. A fixing member 201 can be passed through the through hole 31 and then fixed to the tire pressure monitoring device 200. In this embodiment, the fixing member 201 includes but is not limited to a tenon, a rivet, or a screw.

The at least two stop blocks 40 are provided on the two second plates 23 of the base 20 respectively and are raised in a direction away from the top side 202 of the base 20. In this embodiment, four stop blocks 40 are provided in pairs, and each pair of stop blocks 40 are adjacent to one of the two apertures 231 of the base 20. Each of the two protective members 25 is adjacent to one of the two pairs of stop blocks 40.

This embodiment is notably distinguished from the prior art by the following effects and technical features. First of all, the fixing element 10 is attached to the rim 101. Then, one open end of the annular member 103 is passed through the two apertures 231 of the base 20 of the fixing element 10 successively. After that, the bottom side 204 of the base 20 is tightly attached to the rim 101 thanks to the bendability of the first plate 21 and the two second plates 23 of the base 20 and of the extended sections 232 of the two second plates 23. Next, the two open ends of the annular member 103 are connected and are fastened with a fastener 105 such that both the fixing element 10 and the annular member 103 are radially tightly fixed to the rim 101 while the annular member 103 encircles the rim 101. Following that, the tire pressure monitoring device 200 is mounted on the fixing element 10, with the bottom portion of the tire pressure monitoring device 200 pressed against the two pairs of stop blocks 40, and the fixing member 201 is passed through the through hole 31 of the locking portion 30 of the fixing element 10 and then fixed to the tire pressure monitoring device 200 to conclude the mounting process of the fixing element 10 of the present invention and the tire pressure monitoring device 200.

According to the above, the technical features of the components of the fixing element 10 adapted for the tire pressure monitoring device 200 prevent contact between the bottom portion of the tire pressure monitoring device 200 and the annular member 103, thereby avoiding any indirect impact such contact may have on the fixed state of the tire pressure monitoring device 200 with respect to the locking portion 30 of the fixing element 10. This allows the tire pressure monitoring device 200 to stay securely at its initial mounting position to achieve the intended effect and objective of the present invention.

Having detailed the technical features of the first preferred embodiment of the invention and their effects, the present specification continues to describe those of the second preferred embodiment.

Figure 5:
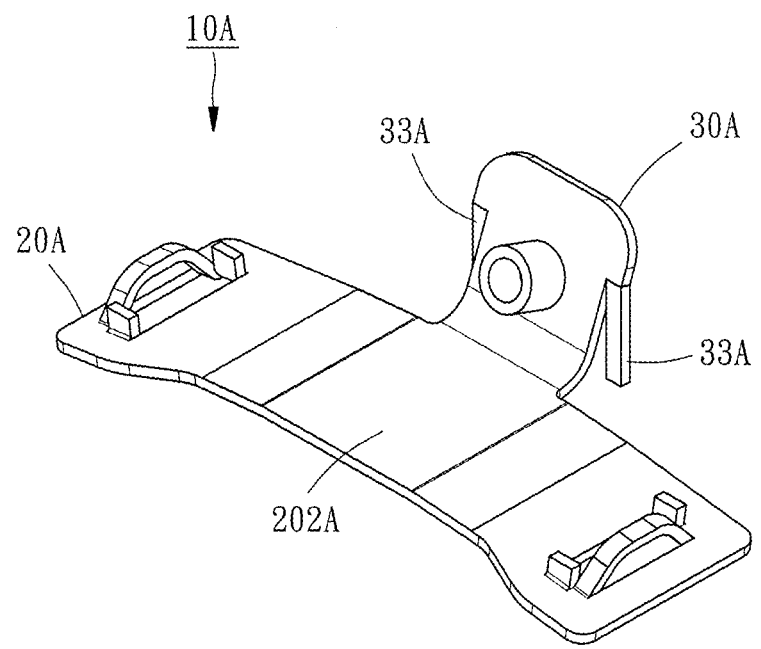
FIG. 5 is a perspective view of the fixing element in the second preferred embodiment of the present invention.

Referring to FIG. 5, the present invention provides a fixing element 10A adapted for a tire pressure monitoring device, wherein the fixing element 10A is generally identical to its counterpart in the first embodiment except for the following:

The locking portion 30A has at least one elastic member 33A protruding a predetermined distance from the second end of the locking portion 30A toward the top side 202A of the base 20A. The at least one elastic member 33A of the locking portion 30A is configured to abut against the rim of a wheel and serve as a buffer between the fixing element 10A and the rim.

In this embodiment, the locking portion 30A has two elastic members 33A provided on two lateral sides of the locking portion 30A respectively. Each elastic member 33A protrudes a predetermined distance from the second end of the locking portion 30A toward the top side 202A of the base 20A.

Having detailed the technical features of the second preferred embodiment of the invention and their effects, the present specification continues to describe those of the third preferred embodiment.

Figure 6:
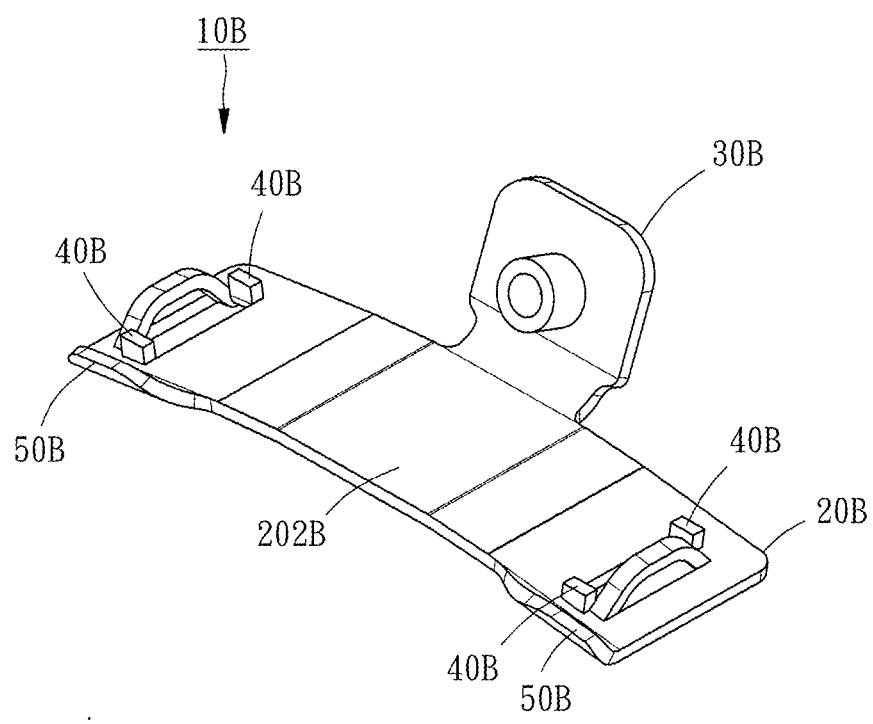
FIG. 6 is a perspective view of the fixing element in the third preferred embodiment of the present invention.

Referring to FIG. 6, the present invention provides a fixing element 10B adapted for a tire pressure monitoring device, wherein the fixing element 10B is generally identical to its counterpart in the first embodiment except for the following:

The fixing element 10B further includes two first lateral wings 50B. Each of the two first lateral wings 50B has one end connected to the other long side of the base 20B and corresponding to the locking portion 30B. The opposite end of each first lateral wing 50B extends a predetermined distance upward from a reference plane defined by the top side 202B of the base 20B.

This embodiment is notably distinguished from the prior art by the following effects and technical features. When the tire pressure monitoring device is mounted on the fixing element 10B, not only is the bottom portion of the tire pressure monitoring device pressed against the stop blocks 40B, but also a long side of the bottom portion of the tire pressure monitoring device is confined by the two first lateral wings 50B of the fixing element 10B.

Having detailed the technical features of the third preferred embodiment of the invention and their effects, the present specification continues to describe those of the fourth preferred embodiment.

Figure 7:
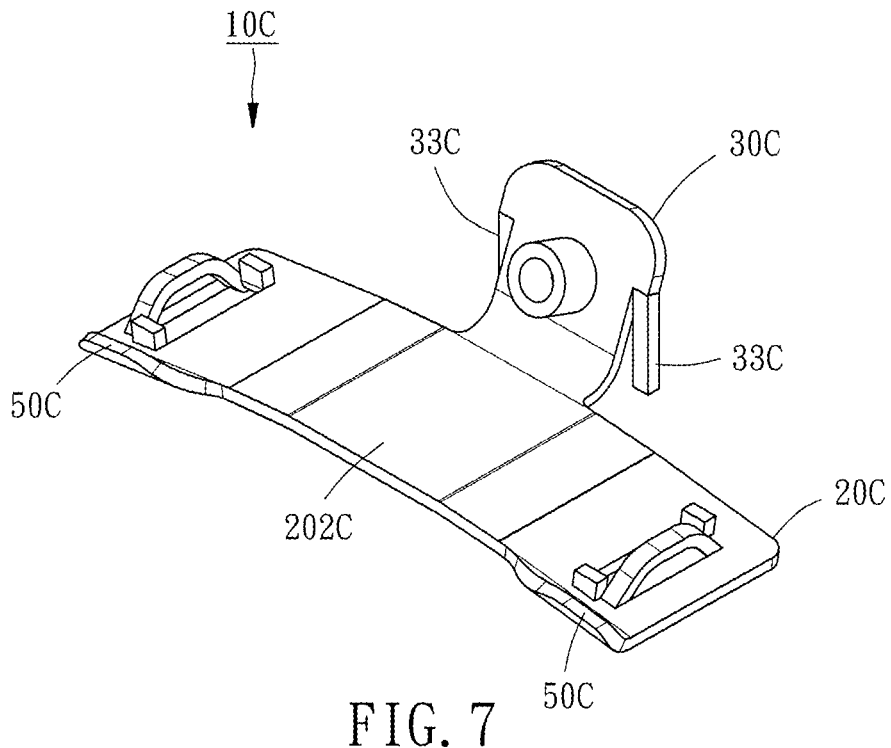
FIG. 7 is a perspective view of the fixing element in the fourth preferred embodiment of the present invention.

Referring to FIG. 7, the present invention provides a fixing element 10C adapted for a tire pressure monitoring device, wherein the fixing element 10C is generally identical to its counterparts in the first, second, and third embodiments except for the following:

The fixing element 10C has two first lateral wings 50C. Each of the two first lateral wings 50C has one end connected to the other long side of the base 20C and corresponding to the locking portion 30C. The opposite end of each first lateral wing 50C extends a predetermined distance upward from the reference plane defined by the top side 202C of the base 20C.

Moreover, the locking portion 30C has two elastic members 33C provided respectively on two lateral sides of the locking portion 30C and each protruding a predetermined distance from the opposite end of the locking portion 30C toward the top side 202C of the base 20C. Similarly, the elastic members 33C of the locking portion 30C are configured to abut against the rim of a wheel and serve as a buffer between the fixing element 10C and the rim.

Having detailed the technical features of the fourth preferred embodiment of the invention and their effects, the present specification continues to describe those of the fifth preferred embodiment.

Figure 8:
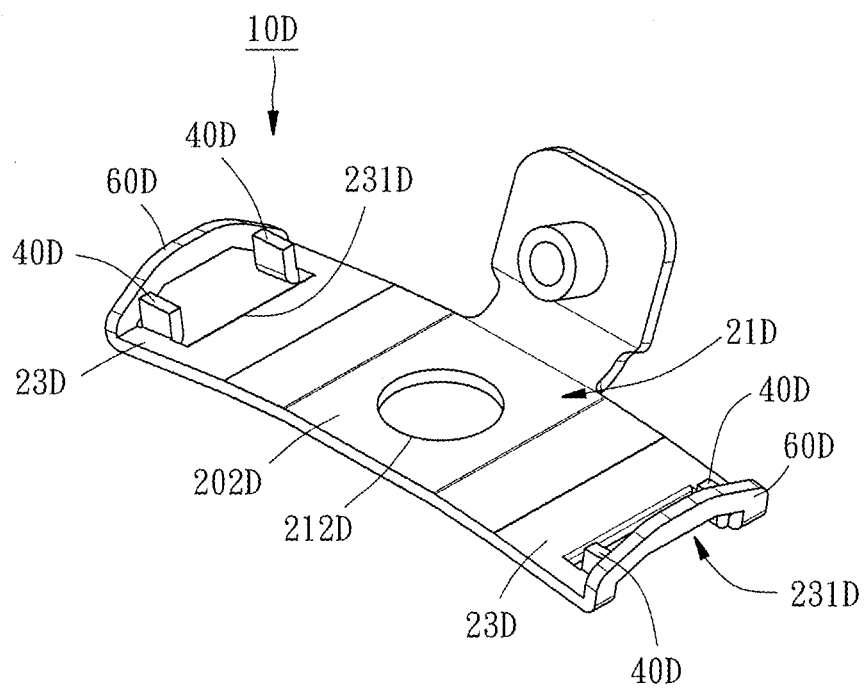
FIG. 8 is a perspective view of the fixing element in the fifth preferred embodiment of the present invention.
Figure 9:
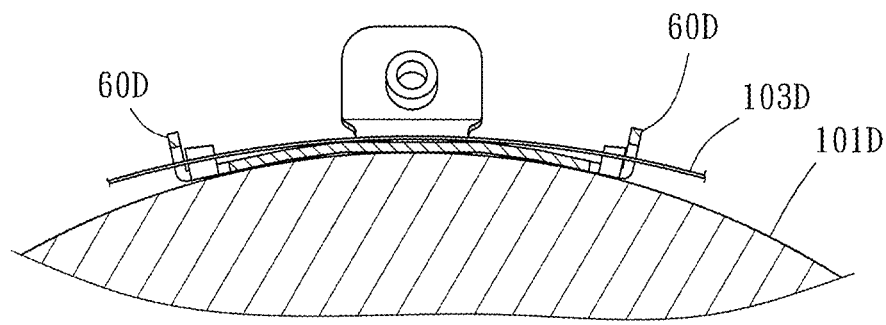
FIG. 9 is a side view showing how the fixing element in the fifth preferred embodiment of the present invention is used.

Referring to FIG. 8 and FIG. 9, the present invention provides a fixing element 10D adapted for a tire pressure monitoring device, wherein the fixing element 10D is generally identical to its counterpart in the first embodiment except for the following:

The first plate 21D of the base 20D has a body portion penetrated by a through hole 212D.

In addition, the fixing element 10D has two second lateral wings 60D. Each of the two second lateral wings 60D has one end connected to one of the two second plates 23D of the base 20D and adjacent to one of the two pairs of stop blocks 40D. The opposite end of each second lateral wing 60D extends upward from the reference plane defined by the top side 202D of the base 20D.

This embodiment is notably distinguished from the prior art by the following effects and technical features. When the tire pressure monitoring device is mounted on the fixing element 10D, not only is the bottom portion of the tire pressure monitoring device pressed against the two pairs of stop blocks 40D, but also the two short sides of the bottom portion of the tire pressure monitoring device are confined by the two second lateral wings 60D of the fixing element 10D respectively.

Having detailed the technical features of the fifth preferred embodiment of the invention and their effects, the present specification continues to describe those of the sixth preferred embodiment.

Figure 10:
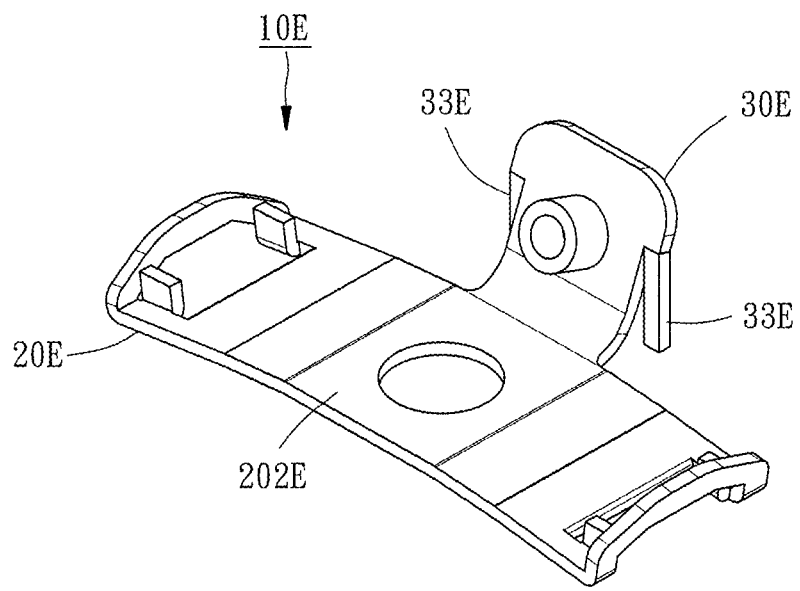
FIG. 10 is a perspective view of the fixing element in the sixth preferred embodiment of the present invention.

Referring to FIG. 10, the present invention provides a fixing element 10E adapted for a tire pressure monitoring device, wherein the fixing element 10E is generally identical to its counterpart in the fifth embodiment except for the following:

The locking portion 30E has two elastic members 33E provided respectively on two lateral sides of the locking portion 30E and each protruding a predetermined distance from the opposite end of the locking portion 30E toward the top side 202E of the base 20E. Similarly, the elastic members 33E of the locking portion 30E are configured to abut against the rim of a wheel and serve as a buffer between the fixing element 10E and the rim.

Having detailed the technical features of the sixth preferred embodiment of the invention and their effects, the present specification continues to describe those of the seventh preferred embodiment.

Figure 11:
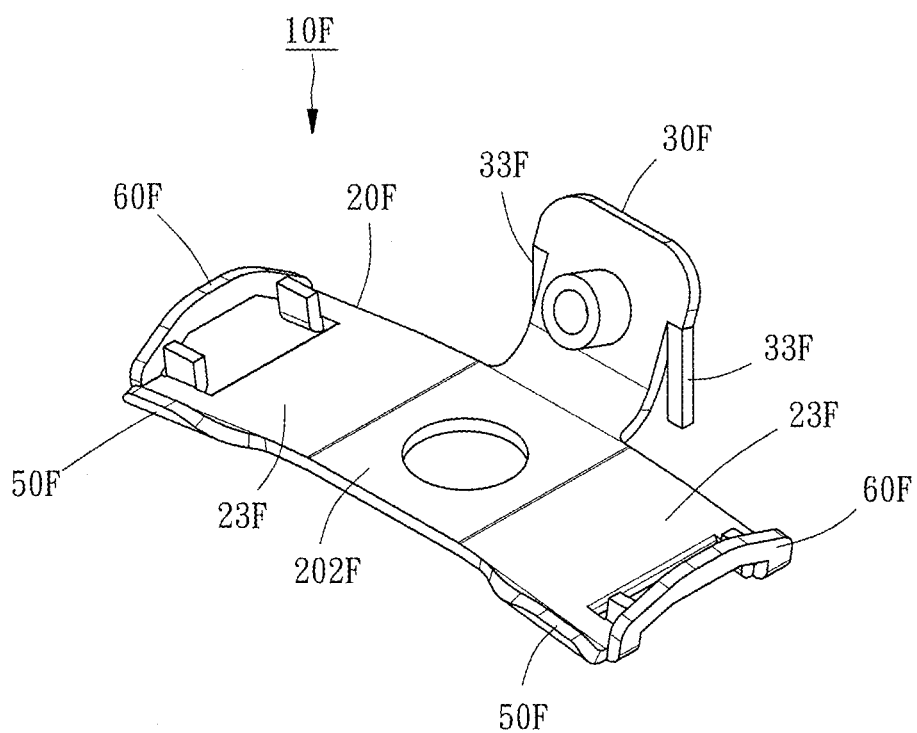
FIG. 11 is a perspective view of the fixing element in the seventh preferred embodiment of the present invention.

Referring to FIG. 11, the present invention provides a fixing element 10F adapted for a tire pressure monitoring device, wherein the fixing element 10F is generally identical to its counterparts in the fifth and sixth embodiments except for the following:

The fixing element 10F has two first lateral wings 50F. Each of the two first lateral wings 50F has one end connected to the second long side of the base 20F and corresponding to the locking portion 30F. The opposite end of each first lateral wing 50F extends upward from the reference plane defined by the top side 202F of the base 20F.

In addition, the fixing element 10F has two second lateral wings 60F. Each of the two second lateral wings 60F has one end connected to one of the two second plates 23F of the base 20F and adjacent to one of the two first lateral wings 50F. The opposite end of each second lateral wing 60F extends upward from the reference plane defined by the top side 202F of the base 20F.

It should be pointed out that, as a person of ordinary skill in the art would understand, the detailed description and embodiments provided herein serve only to demonstrate the structure, method, process flow, and intended effect of the present invention, but not to be restrictive of the scope of the invention. All substitutions and modifications involving the use of an equivalent element, component, article, structure, device, method, or process flow are encompassed by the present invention.

What is claimed is:

1. A fixing element adapted for a tire pressure monitoring device, the fixing element comprising:
    a base composed of a first plate and two second plates, wherein the two second plates are connected to two corresponding lateral sides of the first plate respectively such that the base has an elongated shape, the base has a top side and a bottom side corresponding to the top side, the bottom side of the base is tightly attachable to a rim of a wheel by bending each of the two second plates of the base by a predetermined angle, and each of the two second plates of the base has a body portion penetrated by an aperture through which an annular member can pass;
    a locking portion having an end connected to a long side of the base and an opposite end extending upward from the top side of the base, wherein the locking portion has a through hole, and a fixing member is able to pass through the through hole in order to be fixed to the tire pressure monitoring device;
    at least two stop blocks provided on the two second plates of the base respectively and raised upward from a reference plane defined by the top side of the base; and
    two first lateral wings, wherein each of the two first lateral wings has an end connected to an opposite long side of the base and corresponding to the locking portion, and each of the two first lateral wings has an opposite end extending upward from the reference plane defined by the top side of the base.

2. The fixing element of claim 1, wherein the locking portion has at least one elastic member protruding from the opposite end of the locking portion toward the top side of the base.

3. The fixing element of claim 1, further comprising two second lateral wings, wherein each of the two second lateral wings has an end connected to one of the two second plates of the base and adjacent to one of the two first lateral wings, and each of the two second lateral wings has an opposite end extending upward from the reference plane defined by the top side of the base.

4. A fixing element adapted for a tire pressure monitoring device, the fixing element comprising:
    a base composed of a first plate and two second plates, wherein the two second plates are connected to two corresponding lateral sides of the first plate respectively such that the base has an elongated shape, the base has a top side and a bottom side corresponding to the top side, the bottom side of the base is tightly attachable to a rim of a wheel by bending each of the two second plates of the base by a predetermined angle, and each of the two second plates of the base has a body portion penetrated by an aperture through which an annular member can pass;
    a locking portion having an end connected to a long side of the base and an opposite end extending upward from the top side of the base, wherein the locking portion has a through hole, and a fixing member is able to pass through the through hole in order to be fixed to the tire pressure monitoring device;

at least two stop blocks provided on the two second plates of the base respectively and raised upward from a reference plane defined by the top side of the base; and two second lateral wings, wherein each of the two second lateral wings has an end connected to one of the two second plates of the base and adjacent to one of the two stop blocks, and each of the two second lateral wings has an opposite end extending upward from the reference plane defined by the top side of the base.

5. The fixing element of claim 1, wherein each of the two second plates of the base has an extended section, and the two second plates are connected to the first plate via the two extended sections respectively.

6. The fixing element of claim 5, further comprising two protective members, wherein each of the two protective members is provided on the top side of the base, is raised from a periphery of the aperture of one of the two second plates of the base, and forms a pull-ring structure in order for the annular member to be confined within the pull-ring structures of the two protective members.

7. The fixing element of claim 4, wherein each of the two second plates of the base has an extended section, and the two second plates are connected to the first plate via the two extended sections respectively.

8. The fixing element of claim 7, further comprising two protective members, wherein each of the two protective members is provided on the top side of the base, is raised from a periphery of the aperture of one of the two second plates of the base, and forms a pull-ring structure in order for the annular member to be confined within the pull-ring structures of the two protective members.

9. The fixing element of claim 4, wherein the locking portion has at least one elastic member protruding from the opposite end of the locking portion toward the top side of the base.

* * * * *